United States Patent
Filstein et al.

(10) Patent No.: US 12,553,322 B2
(45) Date of Patent: Feb. 17, 2026

(54) LATE LIFE STEAM DRIVE AND GAS STRATEGY

(71) Applicant: ConocoPhillips Company, Houston, TX (US)

(72) Inventors: Alex Filstein, Houston, TX (US); Javier Sanchez, Houston, TX (US); Julian Ortiz Arango, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 18/748,233

(22) Filed: Jun. 20, 2024

(65) Prior Publication Data
US 2025/0027395 A1    Jan. 23, 2025

Related U.S. Application Data

(60) Provisional application No. 63/514,933, filed on Jul. 21, 2023.

(51) Int. Cl.
*E21B 43/24*    (2006.01)
*E21B 43/16*    (2006.01)
*E21B 43/30*    (2006.01)

(52) U.S. Cl.
CPC ........ *E21B 43/2406* (2013.01); *E21B 43/164* (2013.01); *E21B 43/168* (2013.01); *E21B 43/305* (2013.01)

(58) Field of Classification Search
CPC .. E21B 43/2408; E21B 43/164; E21B 43/168; E21B 43/2406; E21B 43/305; E21B 43/24; E21B 43/166
See application file for complete search history.

(56) References Cited

U.S. PATENT DOCUMENTS

| | | | |
|---|---|---|---|
| 4,344,485 A | 8/1982 | Butler | |
| 5,215,146 A | 6/1993 | Sanchez et al. | |
| 8,387,691 B2 | 3/2013 | Sullivan et al. | |
| 9,267,367 B2 | 2/2016 | Wheeler et al. | |
| 9,567,842 B2 | 2/2017 | Wilfing et al. | |
| 10,145,226 B2 | 12/2018 | Yee et al. | |
| 10,526,881 B2 | 1/2020 | Chen et al. | |
| 10,648,308 B2 | 5/2020 | Chen et al. | |
| 10,995,596 B2 | 5/2021 | Chen et al. | |
| 2016/0341021 A1 | 11/2016 | Chen et al. | |
| 2018/0216449 A1* | 8/2018 | Benzvi | C09K 8/594 |

FOREIGN PATENT DOCUMENTS

| | | | | |
|---|---|---|---|---|
| CA | 2769189 A1 * | 10/2012 | ........... | E21B 43/168 |
| CA | 2776704 A1 | 11/2014 | | |
| CA | 2912159 A1 | 1/2017 | | |
| CA | 3003532 A1 * | 11/2018 | ............. | C09K 8/592 |

OTHER PUBLICATIONS

Butler, R. "Steam and gas push (SAGP)" 1997, PETSOC-97-137.

* cited by examiner

*Primary Examiner* — Zakiya W Bates
(74) *Attorney, Agent, or Firm* — Boulware & Valoir PLLC

(57) ABSTRACT

A method for producing heavy oil while reducing steam usage, the method including producing oil by SAGD or a SAGD variant in an array of wellpairs until an SOR increases, then shutting in every other injector and injecting steam plus noncondensable gas (NCG) in the remaining injectors and producing oil from all producers.

18 Claims, 7 Drawing Sheets

| | CUM. OIL SDG (m3) | CUM. OIL SAGD (m3) | SDG IMPACT |
|---|---|---|---|
| i_wells | 1,572,173 | 1,553,832 | +18,341 |
| d_wells | 1,441,370 | 1,452,885 | -11,515 |
| SUM. | 3,013,543 | 3,006,717 | 6,826 |
| | | IMPACT ON OIL: | +0.20% |
| | | iSOR REDUCTION | 40-50% |

LATE LIFE STEAM DRIVE AND GAS STRATEGY

PRIOR RELATED APPLICATIONS

This application claims priority to U.S. Ser. No. 63/514,933, filed Jul. 21, 2023 and incorporated by reference in its entirety for all purposes.

FEDERALLY SPONSORED RESEARCH STATEMENT

Not applicable.

FIELD OF THE INVENTION

The invention relates to petroleum production, in particular, methods for producing heavy oil and/or bitumen with steam and a non-condensable gas. More particularly, it relates to a strategy for producing heavy oil late in the lifespan of a well that minimizes steam usage without sacrificing and even slightly improving oil production.

BACKGROUND OF THE INVENTION

Production of heavy oil and bitumen from a subsurface reservoir can be quite challenging. The initial viscosity of the oil at reservoir temperature is often greater than five million centipoise (cP) and because of its thickness cannot be pumped. Thus, it must be either mined from the surface or treated in situ to make it pumpable. Since only a relatively small percentage of bitumen and oil sand deposits (such as the Athabasca oils sands of Alberta, Canada) are recoverable through open-pit mining, the majority of heavy oils require some form of in-situ treatment, such as heating the oil with steam or thinning it with solvents.

Steam-assisted gravity drainage (SAGD) is an in-situ method of thinning oil with steam heat that was first introduced by Roger Butler in 1973 as a means of producing viscous oils and is now widely used for recovery of heavy and extra-heavy oil sand resources. Traditional SAGD uses two parallel horizontal wells (see FIG. 1). The lower production well is located at or near the bottom of the play, and the upper well is 4-5 meters above and parallel to it. In a pre-production stage, steam is injected into both wells to conductively heat the petroleum deposit between the wells until the two wells are in fluid communication. This stage—known as start-up—can take on the order of 3-6 months in a typical Athabasca oil sands reservoir. There are other methods of start-up, and the operator is not limited to steam, although it is the most common method of start-up.

Once the wells are in fluid communication, the lower well is converted over to oil production by changing the completion. During this SAGD stage, steam is injected only into the top horizontal well (injection well) and the heated oil and any condensed water are produced by gravity drainage to the lower horizontal well (production well). The heated oil is now pumpable and is typically brought to the surface with a sucker rod pump or an electronic submersible pump (ESP).

SAGD requires on-site steam generation and water treatment, translating into expensive surface facilities. SAGD is also very energy intensive, largely because the reservoir rock and fluids must be heated enough to mobilize the petroleum deposit, but heat is lost to overburden and underburden, water and gas intervals, and to the non-productive rock. On average, a third of the energy is produced back with fluids in the reservoir, a third is lost to overburden and underburden, and a third is left behind in the reservoir after abandonment. These inefficiencies result in a steam-to-oil ratio (SOR) of 3.0 (vol/vol), and a 50-60% recovery factor of the original bitumen contacted by steam. That is for every barrel of oil produced, three barrels of water must be heated to make steam and only about half the oil can be produced. To compound these inefficiencies, heavy oil and bitumen are sold at significant discounts compared to oil product benchmarks, such as West Texas Intermediate (WTI) due to an additional dilution requirement in order to transport the otherwise viscous product.

All of these factors provide an exceedingly challenging economic environment for producing heavy oil. Thus, there have been many efforts to increase SAGD efficiency and/or reduce costs. This is especially true late in the life cycle of a SAGD well, when the SOR begins to increase, and the costs correspondingly increase with the increased steam usage.

One possible strategy is to replace steam with a solvent, which can be recycled, or a non-condensable gas (NCG), which helps to maintain pressure and may provide some solvent ability. Many researchers are therefore looking for ways to optimize steam and solvent/NCG production methods in order to produce heavy oils and bitumen as cost effectively and efficiently as possible, and the patent literature is replete with variations on the steam and solvent/NCG ideas. Variations include changing well arrangement, changing solvents or combinations thereof, changing solvent to steam ratios, changing the timing, and the like.

Roger Butler, for example, describes a steam assisted gas push (SAGP) method wherein he proposed that the SAGD process be modified by injecting NCG, such as natural gas, with the steam from the injection well. The gas accumulates in the steam chamber above the injector and helps to maintain pressure. It also provides some insulating effect, reducing heat loss to the overburden. The process is particularly useful in partially depleted reservoirs where the steam chamber is quite large and maintaining heat and pressure in the large chamber is more expensive than maintaining pressure with NCG and not worrying about high temperatures at the top of the steam chamber. Butler argues that considerable savings can be made by this approach without a substantial decline in performance.

U.S. Pat. No. 10,526,881 (by ConocoPhillips) describes a steam/NCG variation wherein conventional horizontal well-pairs are used in conjunction with an infill production well, to co-inject oil-based solvents with steam initially and then switch to NCG-steam co-injection after establishing thermal communication between the thermal chamber and infill well.

U.S. Pat. No. 10,648,308 (by ConocoPhillips) describes an expanding solvent steam assisted gravity drainage (ES-SAGD) production of heavy oil wherein steam and hydrocarbon solvent are co-injected into a heavy oil reservoir and water, hydrocarbon solvent and heavy oil are produced by gravity drainage until the steam chamber is well developed or until oil recovery reaches about 20-30% of oil in place. At that time, the wells are switched to a lateral sweep using NCG and steam co-injection, where more hydrocarbon solvent is recovered than is recovered with ES-SAGD used alone and where the cumulative steam-to-oil ratio is reduced over using ES-SAGD alone.

U.S. Pat. No. 8,387,691 describes a method using adjacent injector producer well pairs under conditions of SAGD with a lateral drainage well between and substantially parallel to them. The lateral drainage well is operated under conditions of intermittent steam injection and alternating oil, water and gas production; and NCG is co-injected with steam into both the injector wells and the lateral drainage well at selected intervals, and in selected quantities in order to control the steam saturation of the SAGD steam chamber and the rise of the steam chamber, and to encourage lateral fluid communication between the adjacent well pairs and the lateral well. Pressure is initially and briefly high to establish a steam chamber, but thereafter may be reduced to as low as 200 kPa.

US2017138160 and U.S. Pat. No. 10,145,226 describe the injection of steam, solvent and NCG, which combines the benefits of SAGD, VAPEX, and the use of an additional producer, with specific timing specifications for the initiation of solvent injection prior to inter-chamber fluid communication.

CA2776704 describes a method that combines the benefits of SAGP and the use of an additional producer. Regular SAGD is performed in adjacent well-pairs until the steam chamber reaches a certain temperature, then steam/NCG co-injection is initiated in at least one injector. Eventually, an infill well is drilled low in the pay between the well-pairs and production continues.

While each of these patents represents a step forward in optimizing steam and solvent/NCG based processes for recovering heavy oil, there is always room for improvement in steam and solvent/NCG based methods of producing heavy oil. The ideal method would avoid the use of costly solvents and improve on the SAGP method of Butler.

SUMMARY OF THE INVENTION

The invention generally relates to methods to increase the efficiency and timing of steam and NCG injection in an in-situ oil recovery scheme. Described simply, the method involves steam injection followed by steam and gas injection in every other injector in a method we call steam drive and gas or "SDG." In more detail, the method involves:

Phase 1: Produce heavy oil via SAGD, by injecting steam (not steam and solvent, nor solvent alone) into the injector and recovering mobilized oil from the producer in each of an array of well-pairs.

Phase 2: When the critical recovery factor of oil is reached (such as 66% RF) and SOR begins to increase by e.g., at least 10%, initiate the late life NCG and steam co-injection in at least one injector, but preferably in every injector. If desired, this step may be omitted, but if done, SOR is likely to stabilize during this phase due to continued steam and NCG co-injection because steam injection is replaced with NCG and production continues at a similar rate. Continue in this mode until one or more of the following are reached:

1) Steam chambers between adjacent well-pairs are coalesced, and the bottom hole pressure (BHP) is maintained across the pad between 1.5-3.5 mPa. The BHP is maintained across the pad to prevent flow from one wellpair to another, and unless otherwise stated the BHP is equal across the well pairs on a pad.
2) SOR does not stabilize and continues to increase.
3) Oil production declines due to NCG short-circuiting towards the ESP pump.
4) Oil production declines due to regional geological presence of inclined heterolytic stratifications (IHS) which results in poorer performance from wells below IHS regions.
5) Oil production declines, despite increased injection of steam and/or NCG.
6) One of the injectors fails.

Phase 3: Invoke a steam and gas push (SAGP) strategy by shutting in every other injector, while continually injecting steam plus NCG in the remaining injectors. At the same time, maintain producing pumps resulting in oil production from all well-pairs. The well below the shut-in injectors now acts as an infill producer since it is no longer paired with an active injector. Continue producing oil from all available producers in the proposed configuration, injecting approximately half of steam from when the SOR increased for the last time.

If desired, the shut-in injectors could be redrilled to land between the producing wells and also to act as infill wells to realize additional production while reducing the surface footprint. If low enough in the play, the shut-in injectors may simply be converted to production wells.

Phase 0: is a start-up phase that precedes the inventive method and occurs until the wells in a well-pair are in fluid communication. Once achieved, phase 1 is initiated. In some reservoirs, the start-up phase may have occurred in the past, which is why it is not necessarily the first step herein. In addition, there are variant SAGD-like processes that reduce or omit start-up, or use different technology for start-up. See e.g., U.S. Pat. Nos. 5,215,146, 9,567,842.

The invention includes any one or more of the following embodiment(s) in any combination(s) thereof.

---

A method for producing heavy oil, said method comprising:
a) providing an array of well-pairs, each well-pair having a horizontal injection well parallel to and in fluid communication with a horizontal production well, said injection well above said production well;
b) injecting steam into each injection well and producing oil from each production well in said array of well-pairs for a first period of time until a steam-to-oil ratio (SOR) begins to increase or when oil production rate begins to decrease, or combinations thereof;
c) shutting in every other injection well and co-injecting steam plus NCG into each remaining injection well and producing oil from each production well in said array of well-pairs for a final period of time.

A method for producing heavy oil, said method comprising the following steps in order:
a) providing an array of well-pairs, each well-pair having a horizontal injection well parallel to and in fluid communication with a horizontal production well, said injection well above said production well;
b) injecting steam only into each injection well and producing oil from each production well in said array of well-pairs for a first period of time until a steam-to-oil ratio (SOR) begins to increase; then
c) co-injecting steam plus noncondensable gas (NCG) only into each injection well and producing oil from each production well in said array of well-pairs for a second period of time until an oil production rate declines; and then
d) shutting in every other injection well and co-injecting steam plus noncondensable gas (NCG) into each remaining injection well and producing oil from each production well in said array of well-pairs for a third period of time, wherein the SOR is at least 40% lower during said third period than during a SAGD-only method of producing oil. Preferably the SOR is at least 50% lower.

Any method herein described, further comprising converting one or more shut-in injection wells to infill producer wells.

Any method herein described, wherein said first period of time continues until said SOR is greater than 3, or 3.2 or 3.5.

Any method herein described, wherein said first period of time continues until oil production rates decrease by 20%, 30% or 40% or wherein said second period of time continues until oil production rates decrease by 20%, 30% or 40%.

Any method herein described, wherein said NCG is carbon dioxide ($CO_2$), carbon monoxide (CO), nitrogen ($N_2$), methane, ethane, ethylene, nitrogen oxides ($NO_x$), sulfur oxides ($SO_x$), flue gas, or combinations thereof.

Any method herein described, wherein said NCG is $CO_2$.
Any method herein described, wherein said NCG is methane.
Any method herein described, wherein said NCG is flue gas.
Any method herein described, wherein a steam to oil ratio (SOR) is 50% lower during said final period of time than a SAGD-only method of producing oil.

Any method herein described, wherein more oil is produced from production wells paired with shut-in injection wells than in adjacent production wells in an injector/producer well-pair.

Any method herein described, wherein more oil-in-place is produced

-continued in said method than a SAGD-only method of producing oil.
Any method herein described, wherein less cumulative steam is used in said method than a SAGD-only method of producing oil.
Any method herein described, preceded by a start-up step comprising injecting steam into both wells of a well-pair until fluid communication is established between said wells in a well-pair, and then a lower well in a well-pair is converted to a production well.

"Formation" or "reservoir" as used herein refers to a geological structure, that includes one or more hydrocarbon-containing layers, possibly one or more non-hydrocarbon layers, an overburden and/or an underburden. The hydrocarbon layers can contain non-hydrocarbon material as well as hydrocarbon material. The overburden and underburden can contain one or more different types of impermeable materials, for example rock, shale, mudstone wet carbonate, or tight carbonate.

"Petroleum deposit" or "play" refers to an assemblage of hydrocarbons in a geological formation. The petroleum deposit can comprise light and heavy crude oils, natural gas, and bitumen. Of particular interest for the methods described herein are petroleum deposits that are primarily heavy oil and bitumen.

"Heavy oil" as used herein is intended to include heavy, extra heavy and bitumen hydrocarbons.

A "SAGD well-pair" or a "well-pair" refers to traditional horizontal parallel wells where the producer is low in the pay and the injector is 4-5 meters above it. Other wells arrangements are possible in SAGD variants, however. Well-pairs are typically provided in an "array" to cover a play, and infill wells may be added between well-pairs later in the lifecycle of a producing well-pair.

"Injection well" or "injector" refers to a well that is fitted (aka completed) for injection and allows fluid injection into a reservoir. In a producing well-pair, it is typically 4-5 meters over a production well in a play, but may be closer in a thin play or in certain specialized well arrangements.

"Production well" or "producer" refers to a well that is fitted for production and is in and close to the bottom of a play and from which a produced fluid, such as heated heavy oil, is recovered from a geological formation. In SAGD and other gravity drainage processes, the well may be initially fitted for injection, then refitted for production once start-up is complete.

An "infill well" is a well low in the play situated between a conventional horizontal well-pair, and serves to catch oil trapped between the teardrop shaped steam/vapor chambers. These are usually drilled after the array of well-pairs have been producing for a time to capture wedge oil that would otherwise be lost. Herein, when an injector of a well-pair is shut in, the remaining producer acts as an infill well, even though it was initially completed as part of a well-pair. The injected steam and NCG are pushing the oil towards the producers where the injectors are inactive and these producers now act as infill wells.

Shut-in injectors could be converted to actual infill wells, though redrilling may be needed if the injector is too high in the play. This results in a reduced number of injector wells and increased number of producer wells. For example, if we originally had eight (8) well-pairs, we could shut in four (4) injectors during the SDG process and convert them to so-called infill producers. Thus, the final configuration could be four (4) injectors, injecting steam and NCG while pushing oil to the original eight (8) producing wells plus the converted four (4) injectors to infills, resulting in twelve (12) producers on that pad. Thus, initial injector/producer ratio was $8/8=1$ and final injector/producer ratio was $4/12=\frac{1}{3}$, resulting in much lower SOR due to lower steam injection and higher oil production. This method also minimizes the footprint on surface as the same number of wells are utilized. Using the same well pad for new wells greatly saves on costs.

Although we discuss one or two horizontal well-pairs herein, it is understood that there will usually be an array of well-pairs covering a play, and that wells may also have multilateral wells branching off a mother well, or infill wells, as needed to effectively drain a play.

A "multilateral well" refers to a well, which is one of a plurality of horizontal branches, or "laterals", from a mother wellbore. These branch off an existing well, called the "mother" well, and do not reach the surface or have their own well pad. An array of multilaterals off a single mother wellbore may be called a "fishbone."

By "providing" a well or well-pair we do not necessarily imply de novo drilling of wells, as it is possible to perform the inventive method in existing wells, although some refitting may be required.

"Start-up" refers to the process of putting two wells in a gravity-drainage well-pair into fluid communication and is a distinctive phase (herein Phase 0) in a well-pair's lifespan. This is frequently done by injecting steam into both wells, but other methods are possible, including electric, RF or EM heating of wells, solvent-assisted start-up, dilation start-up, combustion based methods, and the like, as well as combinations thereof.

"Wind-down" is another distinct phase in a well's producing life wherein production is slowed and measures are taken, for example, to recover solvent from the reservoir. Wind-down is initiated when oil production is no longer economical, and thus may vary depending on oil prices. However, wind-down is typically initiated when the oil recovery factor reaches a specified threshold or if there SOR increases to high levels where steam could be redeployed elsewhere to operate at lower SOR conditions. When wind-down is complete, the well is shut-in, although it may be opened again when either new technology is developed or when the price of crude oil increases sufficiently.

By injecting "steam only," we mean no NCG or solvent is intentionally injected thereinto. Minor contaminants to the steam are excluded from consideration, however, and include contaminants in the water used to make the steam, entrained gases, and the like. Likewise, co-injecting steam and NCG only means that other solvents are not intentionally added.

"Steam-assisted gravity drainage" or "SAGD" refers to an in-situ recovery method which uses steam and gravity drainage to produce oil from a traditional parallel horizontal well-pair with about 4-5 meters vertical separation and minimal lateral separation, and generally as described by Butler in U.S. Pat. No. 4,314,485. Such a well-pair may be called a "gravity drainage well-pair," and there are variations on the arrangement of such well-pairs beyond the traditional SAGD well-pair, any of which may be used in the invention.

Generally speaking, injectors in a well-pair are roughly "over" the producer, but some leeway in placement is typical as perfect control of drilling is difficult. Further, in some SAGD variants, their placement may vary.

"SAGD variants" includes all SAGD related or modified processes such as steam-assisted gravity push (SAGP), single-well SAGD, solvent-assisted SAGD, varying well placement methods, and the like, as well as the original SAGD method, so long as both steam heating and gravity drainage are employed as the dominant driver of production. The methods used herein can be applied to any SAGD variant.

"Non-condensable gases" or "NCGs" are gases from chemical or petroleum processing units (such as distillation columns or steam ejectors) that are not easily condensed by cooling. Examples of suitable NCGs for solvent assisted recovery processes include, but are not limited to, carbon dioxide ($CO_2$), carbon monoxide (CO), nitrogen ($N_2$), methane, ethane, ethylene, nitrogen oxides ($NO_x$), sulfur oxides ($SO_x$), flue gas, and the like, or combinations thereof. $CO_2$ maybe preferred as a means of sequestering carbon in the reservoir, methane may be preferred where readily available onsite or nearby, or flue gas from local engine use is another preferred option.

"Flue gas" or "combustion gas" refers to an exhaust gas from a combustion process that exits to the atmosphere via a pipe or channel. Flue gas typically comprises nitrogen, $CO_2$, water vapor, oxygen, CO, nitrogen oxides ($NO_x$) and sulfur oxides ($SO_x$). The combustion gases can be obtained by direct steam generation (DSG), reducing the steam-oil ratio and improving economic recovery.

"Hydrocarbon solvent" or "solvent" refers to a chemical consisting of carbon and hydrogen atoms which is added to oil to increase its fluidity and/or decrease viscosity. A hydrocarbon solvent, for example, can be added to a fossil fuel deposit, such as a heavy oil deposit or bitumen, to partially or completely dissolve the material, thereby lowering its viscosity and allowing recovery. The hydrocarbon solvent can have, for example, 1 to 8 carbon atoms ($C_1$-$C_8$), 1-4 carbons ($C_1$-$C_4$), or preferably 1-2 ($C_1$-$C_2$) or 3-4 carbons ($C_3$-$C_4$) herein.

"Steam chamber", "vapor chamber" or "steam vapor chamber" refers to the pocket or chamber of gas and vapor formed in a geological formation by a SAGD, SA-SAGD, SAGP, VAPEX-like and variant processes.

"Production" refers to extraction of petroleum from a petroleum deposit or hydrocarbon-containing layer within a geologic formation.

The use of the word "a" or "an" when used in conjunction with the term "comprising" in the claims or the specification means one or more than one, unless the context dictates otherwise. The use of the term "or" in the claims is used to mean "and/or" unless explicitly indicated to refer to alternatives only or if the alternatives are mutually exclusive.

The term "about" means the stated value plus or minus the margin of error of measurement or plus or minus 10% if no method of measurement is indicated.

The terms "comprise", "have", "include" and "contain" (and their variants) are open-ended linking verbs and allow the addition of other elements when used in a claim. The phrase "consisting of" is closed, and excludes all additional elements. The phrase "consisting essentially of" excludes additional material elements, but allows the inclusions of non-material elements that do not substantially change the nature of the invention, such as varying well arrangements, varying completion parameters, inclusion of additives in the injection fluids, and the like. Any claim or claim element introduced with the open transition term "comprising," may also be narrowed to use the phrases "consisting essentially of" or "consisting of," and vice versa. However, the entirety of claim language is not repeated verbatim in the interest of brevity herein.

The following abbreviations or definitions are used herein:

| | |
|---|---|
| bbl/day | Billion barrels/day |
| BHP | Bottom hole pressure |
| BPD | Barrels per day |
| COP | Cumulative oil production |
| cP | Centipoise |
| CSI | Cyclic solvent injection, like CSS but with a solvent instead of steam. |
| CSOR | Cumulative SOR. |
| CSS | Cyclic steam stimulation-CSS is the alternating injection of steam and production of oil with condensed steam from the same well. The process is a mature process for deep, thicker resources, and involves cycling high-pressure steam injected through the target zone for several weeks to reduce the oil viscosity; then, in the next step, a soaking period is given to the steam to diffuse through the reservoir. Finally, oil is produced from the same well. It is sometimes referred to as huff and puff. |
| CWE | Cold water equivalent |
| DSG | Direct steam generation |
| EM | Electromagnetic |
| ESP | Electronic submersible pump |
| FB | Fishbone. A series of multilateral well segments that trunk or branch off a main horizontal well. The name is given because of the top view that resembles the ribs of a fish skeleton emerging from the backbone. |
| GHG | Greenhouse Gases |
| GOR | Gas-oil ratio |
| IHS | Inclined heterocyclic stratification |
| ISOR | instantaneous SOR (as opposed to cumulative) |
| iWC | Instantaneous water cut (as opposed to cumulative) |
| KPI | key performance indicators |
| MPa | Megapascals |
| NCG | Non-condensable gas. Includes methane, ethane, ethylene, CO2, CO, sulfur oxide, ammonia, hydrogen sulfide, hydrogen, flue gas, nitrogen. |
| OIP | Oil in place. Not to be confused with original oil-in-place or OOIP, OIP is a term that refers to the total oil content of an oil reservoir. As this quantity cannot be measured directly, it has to be estimated from other parameters measured prior to drilling or after production has begun. |
| QA/QC | quality assurance/quality control |
| RF | Recovery factor. The recovered amount of hydro-carbon initially in place, normally expressed as a percentage. |
| RTP | Reservoir Temperature and Pressure |
| SA-SAGD | Solvent Assisted SAGD |
| SAGD | Steam-assisted gravity drainage. A thermal production method for heavy oil that pairs a high-angle injection well with a nearby production well drilled along a parallel trajectory. The pair of high-angle wells is drilled with a vertical separation of about 5 m [16 ft]. Steam is injected into the reservoir through the upper well. As the steam rises and expands, it heats up the heavy oil, reducing its viscosity. Gravity forces the oil to drain into the lower well where it is produced. |
| SAGP | Steam assisted gravity push-SAGP is a thermal oil recovery process that is similar to SAGD but which involves the addition of a small concentration of a non-condensable gas to the steam. |
| SCF | Supercritical Fluid |
| SCTR | sector |
| SDG | steam drive and gas |
| SOIP | SAGD producible oil in place |
| SOR | Steam-to-oil ratio. A parameter used to monitor the efficiency of oil production processes based on steam injection. It measures the volume of steam (expressed as wet water equivalent) required to produce one unit volume of oil. Typical values of SOR for cyclic steam stimulation are in the range of three to eight, while typical SOR values for steam assisted gravity drainage are in the range of two to five. The lower the SOR, the more efficiently the steam is utilized and the lower the associated fuel costs. |
| SW-SAGD | Single well SAGD |
| SW-XSAGD | Single well cross SAGD |
| VAPEX | Vapor Extraction |
| WC | Water cut-Water cut is the percentage of water |

-continued

| | |
|---|---|
| | produced from the well alongside oil and gas. It is typically expressed as a fraction or percentage and measures the ratio of water to the total volume of produced liquids (oil, gas, and water). For example, if a well produces 80 barrels of oil and 20 barrels of water, the water cut is 20%. |
| WPs | Well Pairs |
| WTI | West Texas Intermediate |
| XSAGD | Cross well SAGD |

Spacing between the wells plays an important role when it comes to invoking the SDG process. When the spacing is 125 meters as described in the operation in FIG. 4A, the SDG timing could be invoked at 175 months. However, if the spacing is 66 meters, the SDG process could be invoked closer to 75 months, as there could be less material to mobilize and push while achieving a significant cut in SOR due to lower steam injection rates and similar oil production. Timing and well spacing can be based on the data provided herein, or can be modelled as described herein, or even field tested to provide optimal spacing and timing for the SDG method.

Figures 5, 6:
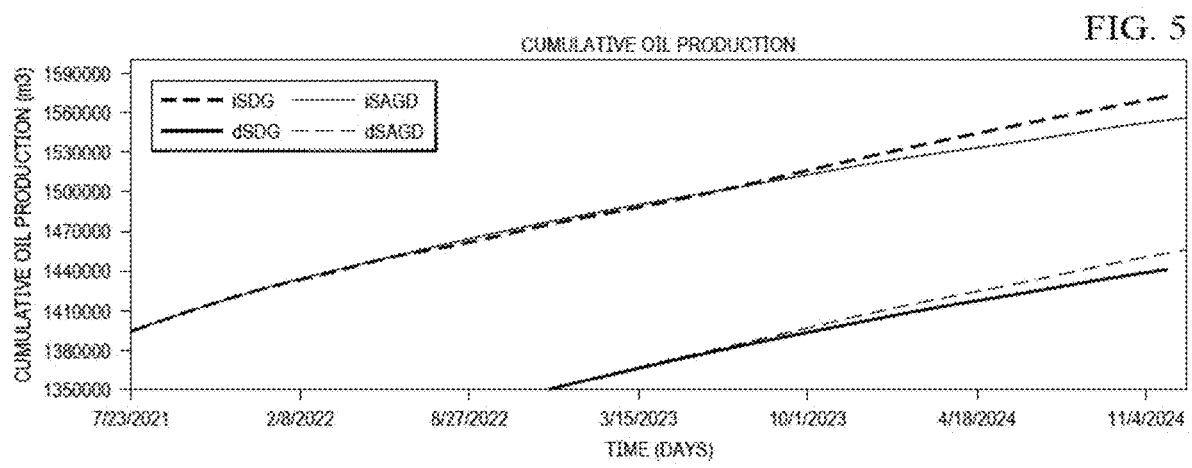
FIG. 5 shows cumulative oil production over time in driver wells (production wells in traditional well-pairs) versus the so-called "infill wells" that were no longer paired with a functioning injector. It is apparent that the infill wells produce more oil than the drivers, suggesting the SDG push is real, although not large. Even though only a small increase is seen here, the opportunity to cut SOR by 50% due to the steam reduction yields a more economically and environmentally friendly operation.

FIG. 6 shows the calculations for the improved oil production (+0.20%) and greatly reduced SOR (40-50%).

Figure 7:
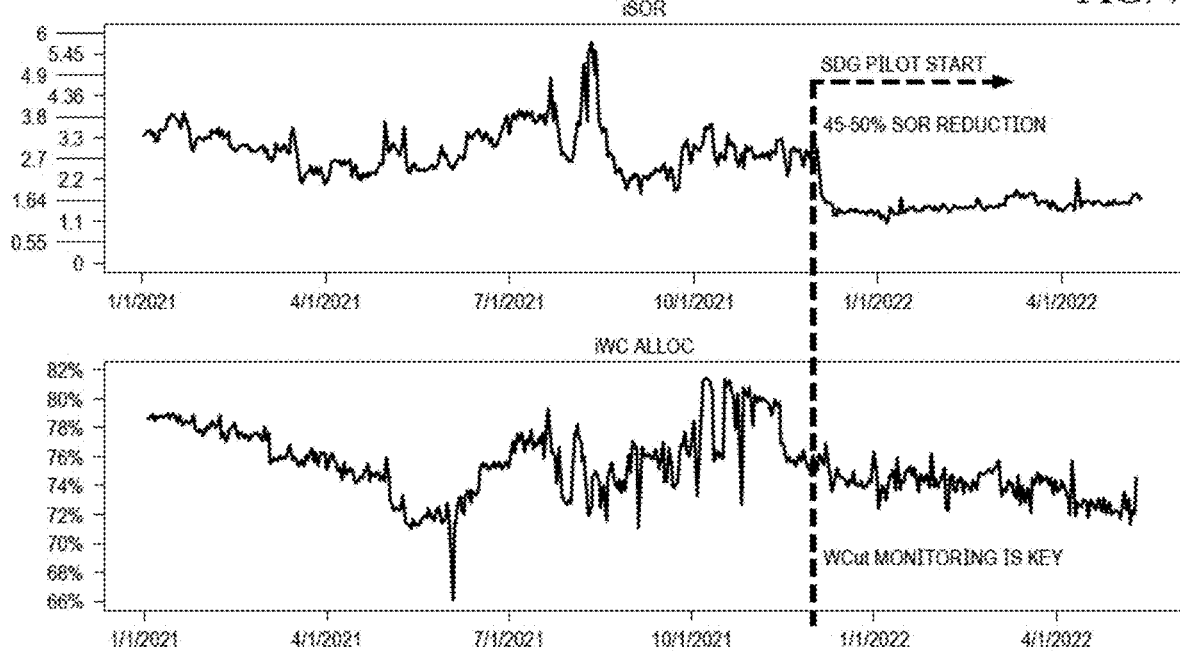

FIG. 7 shows a pilot field study. Steam usage (top panel) in terms of instant SOR (iSOR) and instant water cut (bottom panel) (iWC) for SAGD is shown, with switching to SDG at the black line. Here we see the savings in steam usage, with no loss of oil production.

Note: We also noticed some gas interference with gas production to the ESP (not shown), but this issue is solved by injecting more steam/solvent at the toe than the heel once gas locking is detected. See ESP shielding via toe-dominant solvent injection for more details (U.S. Ser. No. 63/504,957, filed May 30, 2023 and U.S. Ser. No. 18/675,903, filed May 28, 2024).

DESCRIPTION OF EMBODIMENTS OF THE INVENTION

The invention is a two or three-part heavy oil production profile, beginning with steam only injection into the injectors of an array of well-pairs. When the SOR begins to increase (e.g., >3), the injection is switched to steam plus NCG co-injection. This optional stage continues until either the steam chambers fully coalesce or oil production drops. Then every other injector is closed in and steam plus NCG co-injection continues in the remaining open injectors, but production continues in all producers. The method significantly reduces SOR and can even improve oil production. Further, with continued optimization of well spacing, cut-offs, and the like, further improvements may be possible.

The inventive method may be preceded by start-up (as needed), and may be followed by wind-down, blowdown or other end of life well processes.

To provide proof of concept, simulations were performed using CMG STARS, history matching a heterogeneous geomodel from Surmont. The simulation began with SAGD (steam only injections) and switched to SAGD plus NCG at 110 months when SOR spiked, and then switched to SDG at 175 months, cutting steam injection on the pad by roughly 50% as expected for half the wells being used for injection.

Figure 1:
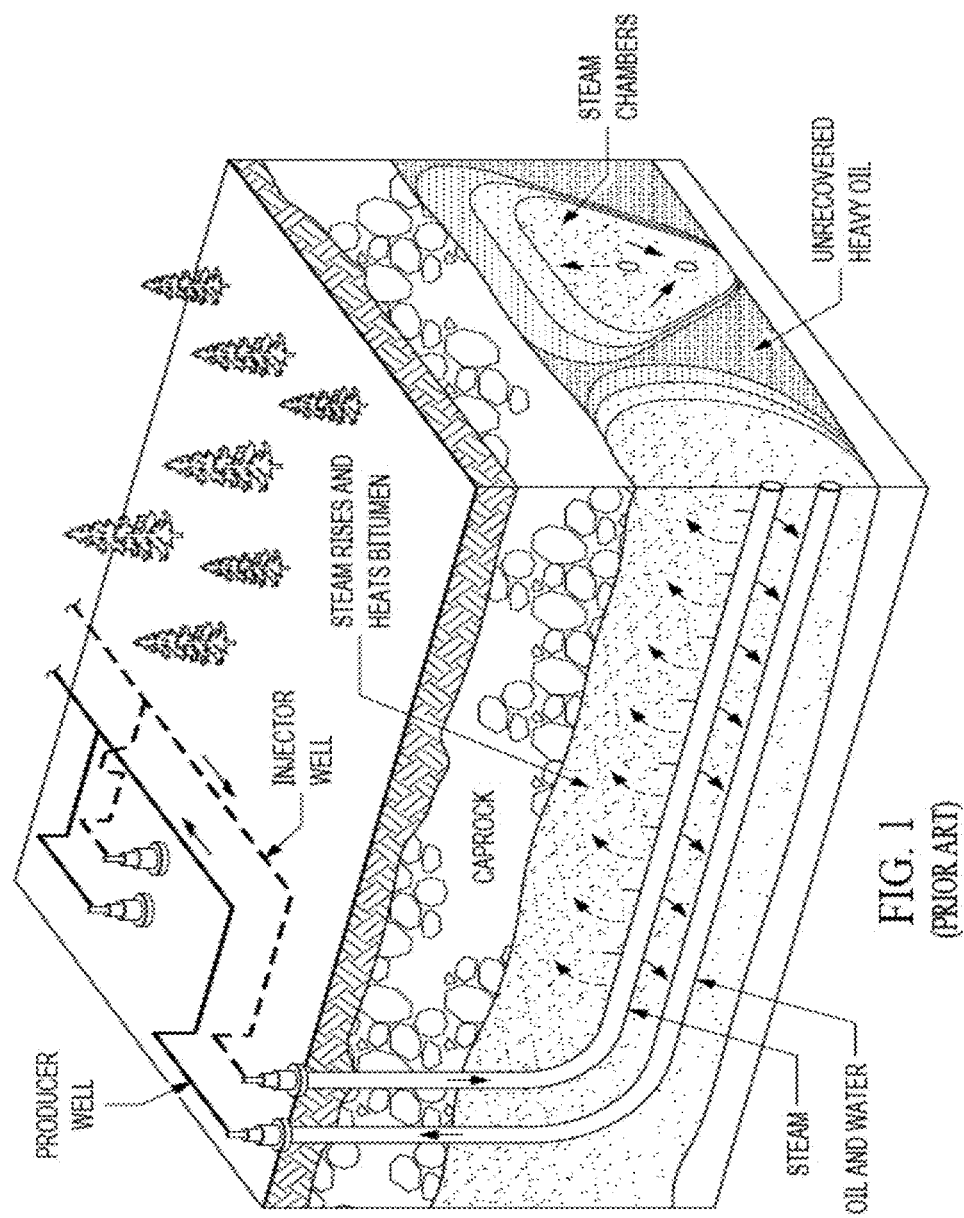
FIG. 1 (prior art) depicts a conventional SAGD well-pair in an oil sand formation.
Figure 2:
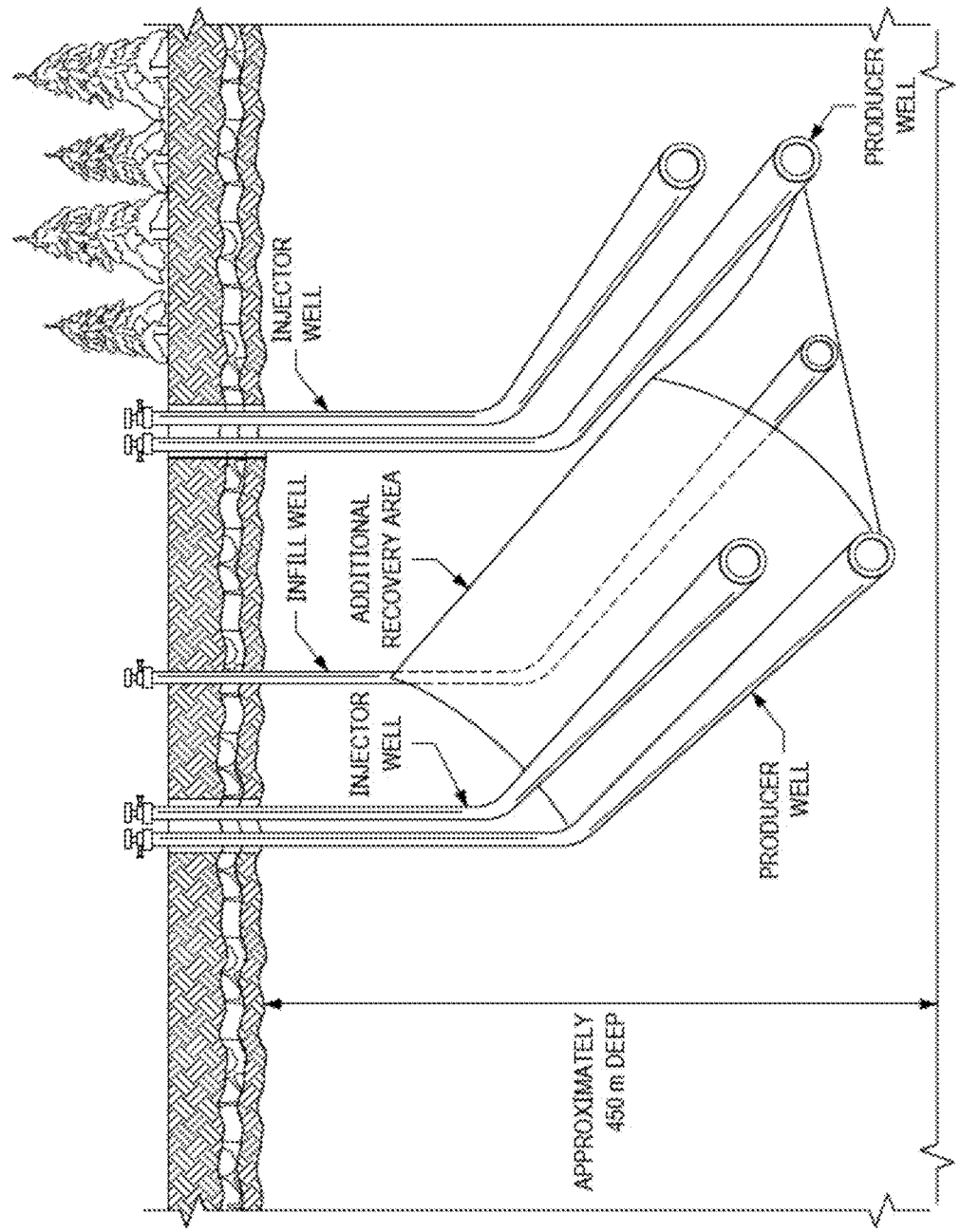
FIG. 2 (prior art) depicts a pair of SAGD well-pairs, with an infill well therebetween that is used to capture oil stranded between the teardrop shaped steam chambers of the adjacent well-pairs. Infill wells are added later in the life cycle of a play, well after the original well-pairs are drilled.
Figure 3:
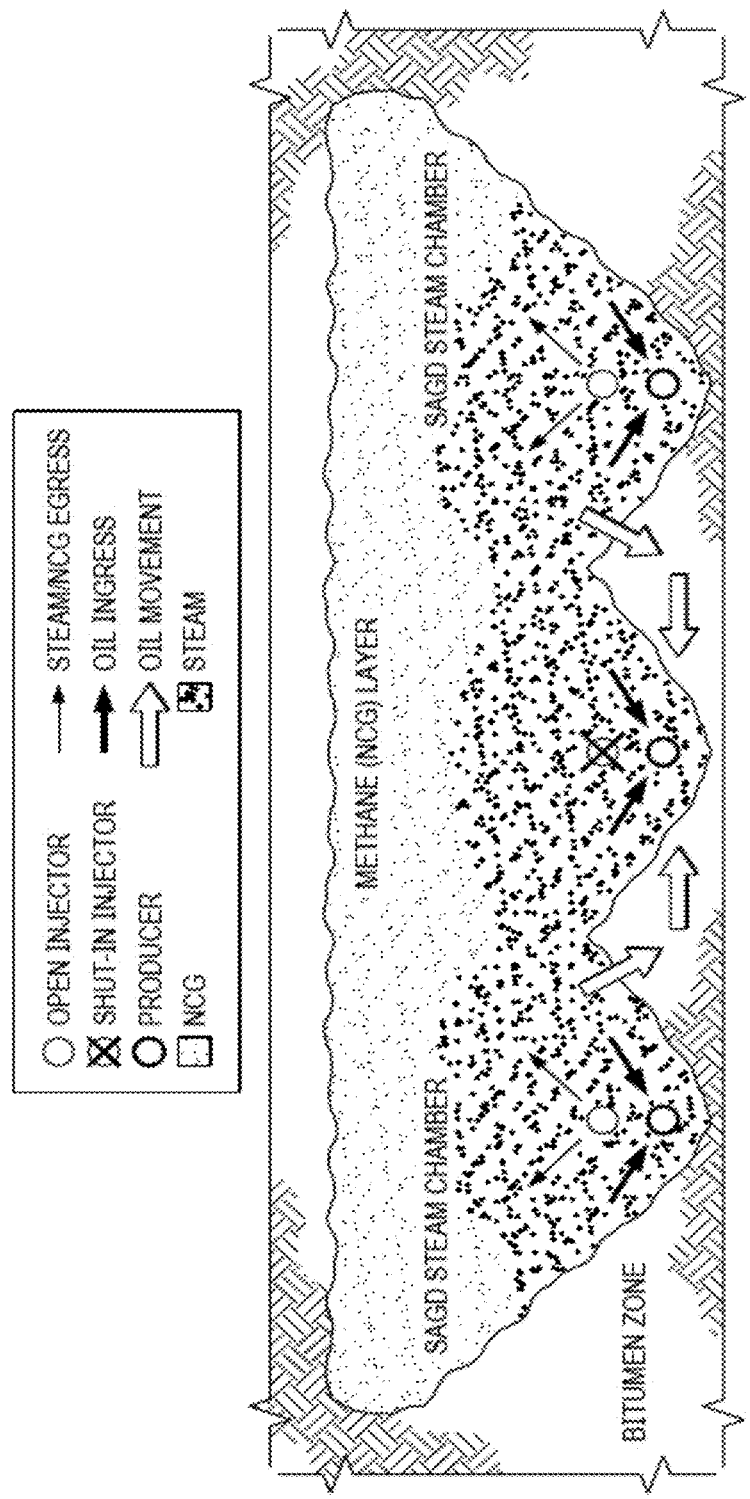
FIG. 3 shows an SDG well arrangement in Phase 3 with every other injector shut-in, leaving the remaining producer to act as an "infill" well. Steam and NCG are co-injected into the remaining injectors, and oil is produced from every producer. The NCG rises in the steam chambers, helping to maintain pressures, reducing SOR and providing some insulating effect.
Figure 4A:
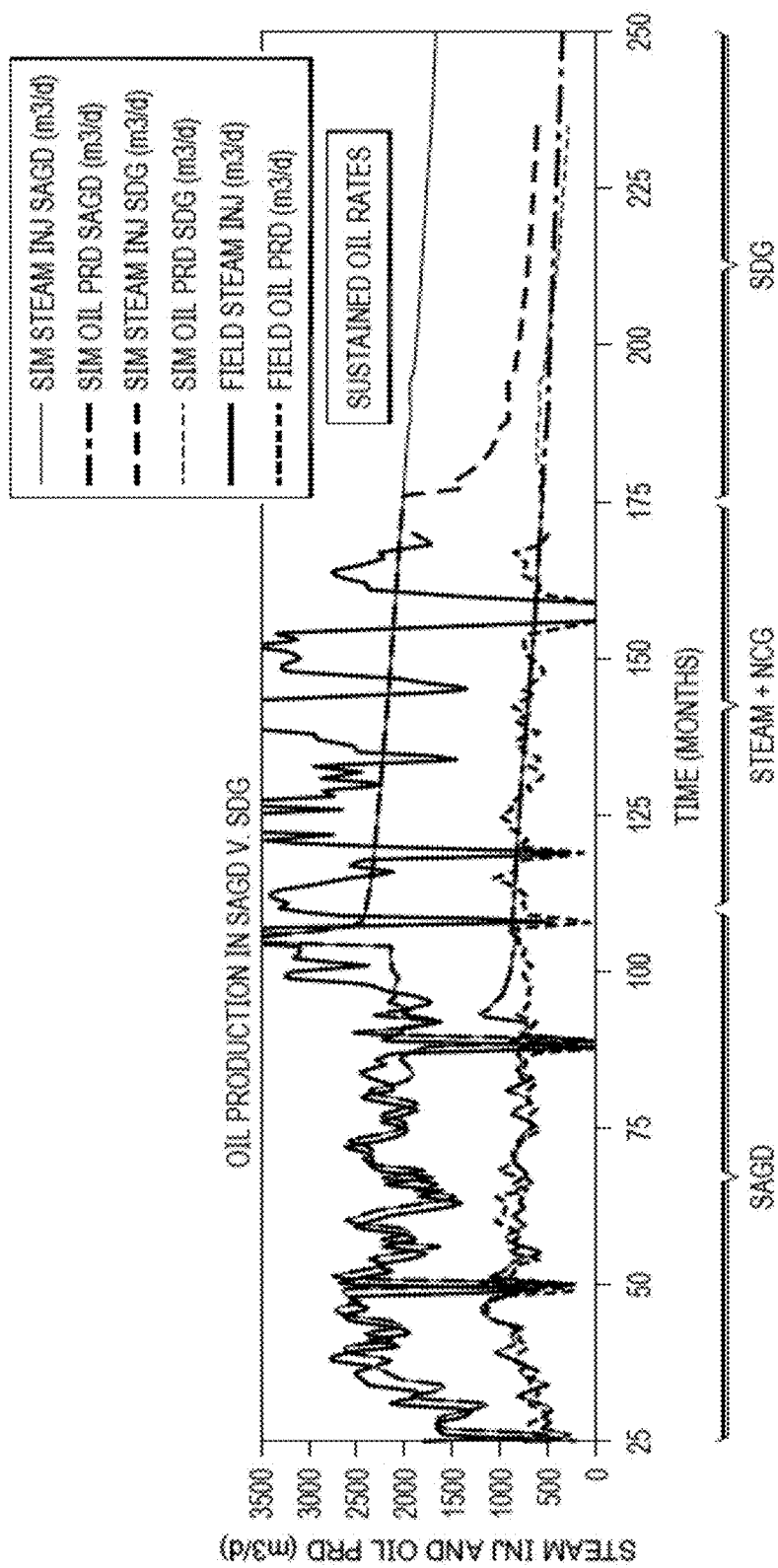
FIG. 4A shows history matched simulated vs. actual field data for parameters such as steam injection rates, oil production rates and SOR for the SAGD and SDG recovery schemes. At 175 month timeframe into the SAGD process, half of the injectors were shut in and the other half injected steam plus NCG resulting in a similar production profile to the SAGD baseline while cutting the SOR by roughly 50%. Thus, the SDG process is invoked as part of the late life strategy allowing reduction in steam injection rates and allocation of that steam to develop new pads.
Figure 4B:
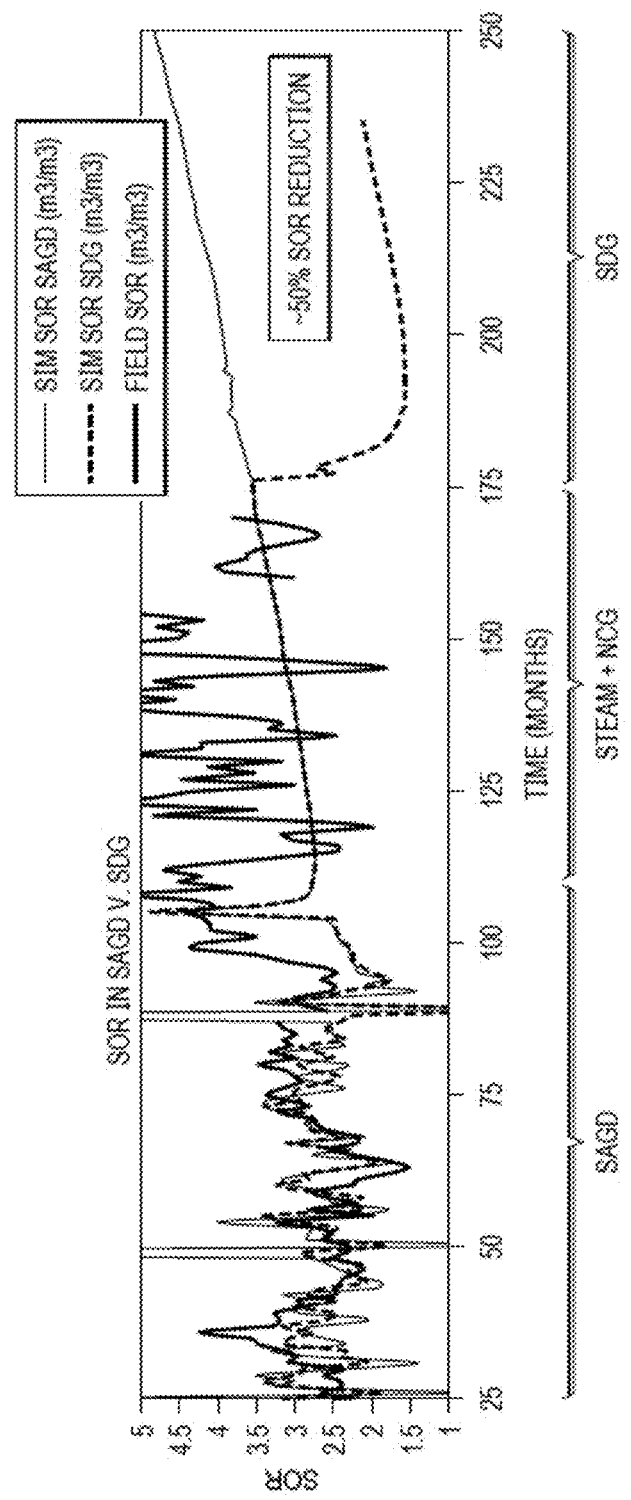
FIG. 4B shows SOR in SAGD versus SDG. Confirming the results in FIG. 4A, we see that SOR is reduced by 50% when SAGD is followed by SDG.

FIG. 4A shows the injection and production profiles for the SAGD-only recovery scheme from time 0-110 months (phase 1), then steam plus NCG to 175 months (phase 2), then SDG technology at 175 months (phase 3). As seen, oil production was maintained close to SAGD-like rates with the SDG well and injection arrangements, while steam injection declines substantially from 2,000 $m^3/d$ to 1,000 $m^3/d$ after one year. This operation resulted in significant decline in the instantaneous SOR by roughly 50% as seen in FIG. 4B. Based on the results of Phase 2 several conditions for invoking SDG were met:

1) Steam chambers between adjacent well-pairs were coalesced, and the bottom hole pressure (BHP) is maintained across the pad between 1.5-3.5 mPa.
2) SOR didn't stabilize and continued to increase.
3) Oil production declined due to NCG short-circuiting towards the ESP pump.
4) Oil production declined due to regional geological presence of inclined heterolytic stratifications (IHS) which results in poorer performance from wells below IHS regions.
5) Oil production rates declined, despite increased injection of steam and/or NCG.

A reservoir simulation study was conducted to quantify the comparative oil production from the "driver" and "infill" wells and is shown in FIG. 5. Driver wells are the producer wells in traditional well-pairs that have injectors that continually co-injecting steam and NCG. The so-called "infill" wells are the producer wells that are paired with shut-in injectors, and thus are positioned the same as infill wells, although drilled at the same time as the array of well-pairs.

When we compare oil production performance, its noticeable that there is slight loss of production from driver wells and slight increase in infill well production. Overall, an increase of roughly 68,000 m³/d was realized via the SDG strategy. This was realized while cutting steam by 50% and observing an SOR reduction of 40-50%.

In addition to our proof-of-concept work, we have also conducted a pilot study in the field and confirmed that our SDG method resulted in a 45-50% decrease in SOR in Phase 3, yet the oil production levels were similar if not better. FIG. 7 shows the field test, confirming this result. Once the switch to SDG was made, steam usage was halved and production was the same.

The above examples are exemplary only, and every reservoir may react differently to different injection fluids because they have a different oil profile, different porosity, different rock characteristics, etc. However, the general methodology may be applied to oil sands and other heavy or extra heavy reservoirs.

The following references are each incorporated by reference in their entireties for all purposes:

U.S. Pat. No. 9,267,367 Method for steam assisted gravity drainage with pressure differential injection.
U.S. Pat. No. 10,526,881 solvents and non-condensable gas coinjection.
U.S. Pat. No. 10,648,308 Solvents and NCG co-injection with tapered pressure.
U.S. Pat. No. 8,387,691 Low pressure recovery process for acceleration of in-situ bitumen recovery.
US2017138160 U.S. Pat. No. 10,145,226 Steam-solvent-gas process with additional horizontal production wells to enhance heavy oil/bitumen recovery.
CA2776704 Modified steam and gas push with additional horizontal production wells to enhance heavy oil/bitumen recovery process.
PETSOC 97-137 (1997) R. Butler, STEAM AND GAS PUSH (SAGP).
U.S. Pat. No. 5,215,146 Method for reducing startup time during a steam assisted gravity drainage process in parallel horizontal wells.
U.S. Pat. No. 4,344,485 Method for continuously producing viscous hydrocarbons by gravity drainage while injecting heated fluids.
U.S. Pat. No. 9,567,842 Radial fishbone SAGD.
63/504,957 (filed May 30, 2023) and U.S. Ser. No. 18/675,903 (filed May 28, 2024) ESP shielding via toe-dominant solvent injection.

The invention claimed is:

1. A method for producing heavy oil, said method comprising:
   a) providing an array of well-pairs, each well-pair having a horizontal injection well parallel to and in fluid communication with a horizontal production well, said injection well above said production well;
   b) injecting steam into each injection well and producing oil from each production well in said array of well-pairs for a first period of time until a steam-to-oil ratio (SOR) begins to increase or an oil production rate begins to decrease, or combinations thereof;
   c) shutting in every other injection well and co-injecting steam plus noncondensable gas (NCG) into each remaining injection well and producing oil from each production well in said array of well-pairs for a final period of time.

2. The method of claim 1, further including step b2) before step c) wherein step b2 is co-injecting steam plus NCG into each injection well and producing oil from each production well in said array of well-pairs for a second period of time, said second period of time continuing until oil production rates further decline, and then implementing step c).

3. The method of claim 2, wherein said first period of time continues until oil production rates decrease by 20-40% or wherein said second period of time continues until oil production rates decrease by 20-40%.

4. The method of claim 1, further comprising converting one or more shut-in injection wells to infill producer wells.

5. The method of claim 1, wherein said first period of time continues until said SOR is >3.

6. The method of claim 1, wherein said NCG is carbon dioxide ($CO_2$), carbon monoxide (CO), nitrogen ($N_2$), methane, ethane, ethylene, nitrogen oxides ($NO_x$), sulfur oxides ($SO_x$), flue gas, or combinations thereof.

7. The method of claim 1, wherein said NCG is $CO_2$.

8. The method of claim 1, wherein said NCG is methane.

9. The method of claim 1, wherein said NCG is flue gas.

10. The method of claim 1, wherein a steam to oil ratio (SOR) is 50% lower during said final period of time than a SAGD-only method of producing oil or an SOR during said first period of time.

11. The method of claim 1, wherein more oil is produced from production wells paired with shut-in injection wells than in adjacent production wells in an injector/producer well-pair.

12. A method for producing heavy oil, said method comprising the following steps in order:
   a) providing an array of well-pairs, each well-pair having a horizontal injection well parallel to and in fluid communication with a horizontal production well, said injection well above said production well;
   b) injecting steam only into each injection well and producing oil from each production well in said array of well-pairs for a first period of time until a steam-to-oil ratio (SOR) begins to increase; then
   c) co-injecting steam plus noncondensable gas (NCG) only into each injection well and producing oil from each production well in said array of well-pairs for a second period of time until an oil production rate declines; and then
   d) shutting in every other injection well and co-injecting steam plus NCG into each remaining injection well and producing oil from each production well in said array of well-pairs for a third period of time, wherein the SOR is at least 40% lower during said third period than during a SAGD-only method of producing oil.

13. The method of claim 12, wherein said first period of time continues until said SOR is >3.

14. The method of claim 12, wherein said second period of time continues until said oil production rate declines by 20-40%.

15. The method of claim 12, wherein said NCG is carbon dioxide ($CO_2$), carbon monoxide (CO), nitrogen ($N_2$), methane, ethane, ethylene, nitrogen oxides ($NO_x$), sulfur oxides ($SO_x$), flue gas, or combinations thereof.

16. The method of claim 12, wherein the SOR is 50% lower during said third period than a SAGD-only method of producing oil.

17. The method of claim 12, wherein more oil is produced from production wells paired with shut-in injection wells than in adjacent well-pairs.

18. The method of claim 12, preceded by a start-up step comprising injecting steam into both wells of a well-pair until fluid communication is established between said wells in a well-pair, and then a lower well in a well-pair is converted to a production well.

\* \* \* \* \*